United States Patent
Agrawal et al.

(10) Patent No.: US 9,367,642 B2
(45) Date of Patent: Jun. 14, 2016

(54) FLEXIBLE STORAGE OF XML COLLECTIONS WITHIN AN OBJECT-RELATIONAL DATABASE

(75) Inventors: Abhyudaya Agrawal, San Francisco, CA (US); Sivasankaran Chandrasekar, Palo Alto, CA (US); Ravi Murthy, Fremont, CA (US); Nipun Agarwal, Santa Clara, CA (US); Eric Sedlar, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2915 days.

(21) Appl. No.: 11/246,039

(22) Filed: Oct. 7, 2005

(65) Prior Publication Data

US 2007/0083542 A1 Apr. 12, 2007

(51) Int. Cl.
*G06F 17/30* (2006.01)
*G06F 7/00* (2006.01)

(52) U.S. Cl.
CPC ............ *G06F 17/30923* (2013.01); *G06F 7/00* (2013.01)

(58) Field of Classification Search
USPC ........... 707/100, 102, 100.103 Y, 103 Y, 803, 707/810
See application file for complete search history.

(56) References Cited

U.S. PATENT DOCUMENTS

| | | |
|---|---|---|
| 5,295,261 A | 3/1994 | Simmonetti |
| 5,404,513 A | 4/1995 | Powers et al. |
| 5,467,471 A | 11/1995 | Bader |
| 5,680,614 A | 10/1997 | Bakuya et al. |
| 5,724,577 A | 3/1998 | Exley et al. |
| 5,734,887 A | 3/1998 | Kingberg et al. |
| 5,878,415 A | 3/1999 | Olds |
| 5,974,407 A | 10/1999 | Sacks |
| 5,987,506 A | 11/1999 | Carter et al. |
| 5,999,941 A | 12/1999 | Andersen |
| 6,012,067 A | 1/2000 | Sarkar |

(Continued)

FOREIGN PATENT DOCUMENTS

| | | |
|---|---|---|
| EP | 1 241 589 A2 | 9/2002 |
| WO | WO 00/49533 | 8/2000 |

(Continued)

OTHER PUBLICATIONS

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

(Continued)

*Primary Examiner* — Boris Gorney
*Assistant Examiner* — Bao Tran
(74) *Attorney, Agent, or Firm* — Hickman Palermo Becker Bingham, LLP

(57) ABSTRACT

A database server determines, on an element-level of granularity, what form of VARRAY storage to map collections of elements defined by a XML schema. A collection element may be mapped to an in-line VARRAY or an out-of-line VARRAY. The determination may based on a variety of factors, including the database type mapped to the collection element, database limitations that limit the form storage for certain database types, and annotations ("mapping annotations") embedded within that XML schema that specifying a database type for database representation of a collection element or a form of VARRAY storage.

14 Claims, 3 Drawing Sheets

(56) References Cited

U.S. PATENT DOCUMENTS

| | | | |
|---|---|---|---|
| 6,038,563 A | 3/2000 | Bapat et al. | |
| 6,055,544 A | 4/2000 | DeRose et al. | |
| 6,061,684 A | 5/2000 | Glasser et al. | |
| 6,061,690 A * | 5/2000 | Nori et al. | 707/103 R |
| 6,128,610 A | 10/2000 | Srinivasan et al. | |
| 6,128,621 A * | 10/2000 | Weisz | 707/103 Y |
| 6,141,655 A | 10/2000 | Johnson et al. | |
| 6,154,741 A | 11/2000 | Feldman | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,240,407 B1 | 5/2001 | Chang et al. | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1 | 7/2002 | Sarkar | |
| 6,438,540 B2 | 8/2002 | Nasr et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,571,231 B2 | 5/2003 | Sedlar | |
| 6,574,655 B1 | 6/2003 | Libert et al. | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,675,354 B1 | 1/2004 | Claussen et al. | |
| 6,718,322 B1 | 4/2004 | Brye | |
| 6,721,727 B2 | 4/2004 | Chau et al. | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,779,152 B1 | 8/2004 | Conner et al. | |
| 6,785,673 B1 | 8/2004 | Fernandez et al. | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,871,204 B2 | 3/2005 | Krishnaprasad et al. | |
| 7,031,956 B1 | 4/2006 | Lee et al. | |
| 7,092,967 B1 * | 8/2006 | Pannala et al. | |
| 7,120,645 B2 * | 10/2006 | Manikutty et al. | |
| 7,685,137 B2 * | 3/2010 | Liu et al. | 707/999.1 |
| 7,809,763 B2 * | 10/2010 | Nori et al. | 707/802 |
| 2002/0015042 A1 | 2/2002 | Robotham et al. | |
| 2002/0035606 A1 | 3/2002 | Kenton | |
| 2002/0038358 A1 | 3/2002 | Sweatt, III et al. | |
| 2002/0056025 A1 | 5/2002 | Qiu et al. | |
| 2002/0073019 A1 | 6/2002 | Deaton | |
| 2002/0087510 A1 | 7/2002 | Weinberg et al. | |
| 2002/0116371 A1 | 8/2002 | Dodds et al. | |
| 2002/0116457 A1 | 8/2002 | Eshleman et al. | |
| 2002/0120685 A1 | 8/2002 | Srivastava et al. | |
| 2002/0123993 A1 | 9/2002 | Chau et al. | |
| 2002/0124100 A1 | 9/2002 | Adams | |
| 2002/0133484 A1 | 9/2002 | Chau et al. | |
| 2002/0143512 A1 | 10/2002 | Shamoto et al. | |
| 2002/0156772 A1 | 10/2002 | Chau et al. | |
| 2002/0156811 A1 | 10/2002 | Krupa | |
| 2002/0169788 A1 | 11/2002 | Lee et al. | |
| 2002/0184188 A1 | 12/2002 | Mandyam et al. | |
| 2002/0184401 A1 | 12/2002 | Kadel, Jr. et al. | |
| 2002/0198874 A1 | 12/2002 | Nasr et al. | |
| 2003/0004937 A1 | 1/2003 | Salmenkaita et al. | |
| 2003/0009361 A1 | 1/2003 | Hancock et al. | |
| 2003/0014397 A1 | 1/2003 | Chau et al. | |
| 2003/0033285 A1 | 2/2003 | Jalali et al. | |
| 2003/0065659 A1 | 4/2003 | Agarwal et al. | |
| 2003/0093672 A1 | 5/2003 | Cichowlas | |
| 2003/0101194 A1 | 5/2003 | Rys et al. | |
| 2003/0140308 A1 * | 7/2003 | Murthy et al. | 715/500 |
| 2003/0154204 A1 | 8/2003 | Chen-Wright et al. | |
| 2003/0158897 A1 | 8/2003 | Ben-Natan et al. | |
| 2003/0172135 A1 | 9/2003 | Bobick et al. | |
| 2003/0182624 A1 | 9/2003 | Large | |
| 2004/0043758 A1 | 3/2004 | Sorvari et al. | |
| 2004/0064466 A1 * | 4/2004 | Manikutty et al. | 707/100 |
| 2004/0148278 A1 | 7/2004 | Milo et al. | |
| 2004/0176958 A1 | 9/2004 | Salmenkaita et al. | |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2004/0267760 A1 | 12/2004 | Brundage et al. | |
| 2005/0010896 A1 | 1/2005 | Meliksetian et al. | |
| 2005/0050058 A1 | 3/2005 | Jain et al. | |
| 2005/0050092 A1 | 3/2005 | Jain et al. | |
| 2005/0289125 A1 | 12/2005 | Liu et al. | |
| 2006/0031233 A1 | 2/2006 | Liu et al. | |
| 2006/0259519 A1 | 11/2006 | Yakushev et al. | |
| 2007/0011167 A1 | 1/2007 | Krishnaprasad et al. | |

FOREIGN PATENT DOCUMENTS

| | | |
|---|---|---|
| WO | WO 01/42881 A2 | 6/2001 |
| WO | WO 01/59602 A1 | 8/2001 |
| WO | WO 01/61566 A1 | 8/2001 |

OTHER PUBLICATIONS

Josephine Cheng, et al., "IBM DB2 XML Extender, An end-to-end solution for storing and retrieving XML documents.," IEEE, ICDE '00 Conference, San Diego, Feb. 2000, 128 pages.

R. Bourret et al.: A Generic Load/Extract Utility for Data Transfer Between XML Documnts and Relational Databases, Jun. 8-9, 2000, IEEE Computing SOC., pp. 134-143.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

J. Shanmugasundaram, et al. "Querying XML Views of Relational Data," Proceedings of the 27th Very Large Databases Conference, Rome, Italy, Sep. 2001, pp. 261-270.

Sandeepan Banerjee, Oracle Corporation, "Oracle 9i 'Project XDB'—The XML Database," Oracle—2001, (pp. 1-18).

Sandeepan Banerjee, et al., "Oracle8i—The XML Enabled Data Management System," Oracle Corporation, Mar. 2000 IEEE pp. 561-568.

Ramon Lawrence et al., "Integrating Relational Database Schemas Using a Standardized Dictionary," 2001, ACM (pp. 225-230).

Latifur Khan et al., "A Performance Evaluation of Storing XML Data in Relational Database Management Systems," ACM-2001 (pp. 31-38).

Philip Bohannon, et al., "From XML Schema to Relations: A Cost-Based Approach to XML Storage," Bell Laboratories, IEEE, 2002, Proceedings of the 18th International Conference on Data Engineering (ICDE'02), 12 pages.

Raghu Ramakrishnan, et al., "SRQL: Sorted Relational Query Language," Jul. 1-3, 1998, IEEE pp. 84-95.

Daniela Florescu et al., "A Performance Evaluation of Alternative Mapping Schemes for Storing XML Data in a Relational Database," May 1999, XP-002168318, pp. 1-31.

(56) References Cited

OTHER PUBLICATIONS

Melton, John, "ISO-ANSI Working Draft, XML-Related Specifications (SQL/XML)," WG3: DRS-020, H2-2002-365, Aug. 2002, 154 pages.
Oracle Corporation, "Oracle9i XML Database Developer's Guide—Oracle XML DB," Release 2 (9.2), Mar. 2002, Part No. A96620-1, pp. 4-31-4-35, 5-21-5-24 and 5-70-5-71.
W3C, "XML Schema Part 1: Structures," W3C Recommendation, May 2, 2001, <http://www.w3.org/TR/2001/REC-xmlschema-1-20010502/>, pp. 1-203.
W3C, "XML Schema Part 2: Datatypes," W3C Recommendation, May 2, 2001, <http://www.w3.org/TR/2001/REC-xmlschema-2-20010502/>, pp. 1-146.
Ming-Ling Lo et al., "XAS: A System for Accessing Componentized, Virtual XML Documents," IEEE, 2001, pp. 493-502.
Andrea Zisman et al., "Using XML to Build Consistency Rules for Distributed Specifications," Proceedings of the Tenth International Workshop on Software Specification and Design (IWSD'00), IEEE 2000, 8 pages.
Jussi Myllymaki, "Effective Web Data Extraction with Standard XML Technologies," WWW10, May 1-5, 2001, pp. 689-696.
Albrecht Schmidt et al., "Why and How to Benchmark XML Databases," SIGMOND Record, vol. 3, No. 3, Sep. 2001, pp. 27-32.
Japanese Patent Office, "Notice of Grounds of Rejection", Patent application No. 533163/2003, mailed Aug. 19, 2008, 7 pages.
Claims, Patent application No. 533163/2003, 9 pages.
Tomoharu, Asami, "Development of Database System by XML, Relaxer, and JDBC", partial English translation, XML Press, Gijutsu-Hyohron Co., Jul. 10, 2001, vol. 3, 2 pages.
Makoto, Onizuka, "XML and Database", partial English translation, XML Magazine, Shoeisha Co., Ltd., Jul. 1, 2000, vol. 10, No. 3, 1 page.
Hironobu, Koyaku, "What is brought to SQL Server 2000 by XML?", partial English translation, Enterprise Servers, IDG Japan, Dec. 1, 2000, vol. 3, No. 12, 1 page.

* cited by examiner

FLEXIBLE STORAGE OF XML COLLECTIONS WITHIN AN OBJECT-RELATIONAL DATABASE

RELATED APPLICATION

This application is related to U.S. patent Ser. No. 10/259,278, entitled Mechanism for Mapping XML Schemas to Object-Relational Database Systems, filed by Ravi Murthy, et al. on Sep. 27, 2002, the contents of which are herein incorporated by reference as if originally set forth herein.

This application is related to U.S. patent Ser. No. 08/962,535, entitled Apparatus And Method For Storage Of Object Collections In A Database System, filed by Anil Nori, et al. on Oct. 31, 1997 and now issued as U.S. Pat. No. 6,061,690 on May 9, 2000, the contents of which are incorporated herein by reference and referred to herein as the Database Object Collections.

FIELD OF THE INVENTION

The present invention relates to representing XML data in a database, and in particular, to representing collections of XML elements in a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is the standard for data and documents that is finding wide acceptance in the computer industry. XML describes and provides structure to a body of data, such as a file or data packet. The XML standard provides for tags that delimit sections of XML documents referred to as XML elements.

Information about the structure of specific types of XML documents may be specified in documents referred to as "XML schemas". For example, the XML schema for a particular type of XML document may specify the names for the elements contained in that type of XML document, the hierarchical relationship between the elements contained in that type of XML document, and the type of values contained in that particular type of XML document. Standards governing XML schemas include XML Schema, Part 0, Part 1, Part 2, W3C Recommendation, 2 May 2001, the contents of which are incorporated herein by reference, XML Schema Part 1: Structures, Second Edition, W3C Recommendation 28 Oct. 2004, the contents of which are incorporated herein by reference, and XML Schema Part 2: Datatypes Second Edition, W3C Recommendation 28 Oct. 2004, the contents of which incorporated herein by reference.

XML Storage Mechanisms

Various types of storage mechanisms are used to store a XML document. One type of storage mechanism stores a XML document as a text file in a file system.

Another type of storage mechanism uses object-relational database systems that are enhanced to store and process queries for collections of XML documents. Furthermore, these object-relational database systems can store and manage XML documents as instances of XML schemas. To store and manage the XML documents in a database system, database representations, defined in terms of data types, handled by the database system, referred to herein as database types, are used to represent XML documents. Database types include, for example, native database types, such as integer and VARCHAR ("variable length character string"), or object types defined for a database system using a DDL statements (data definition language statements.

For example, a database representation of an entire XML document may be a CLOB (binary large object), or maybe one or more tables whose columns store the components of a XML document in one or more rows. A database representation may be a hierarchy of objects in an object-relational database; each object is an instance of an object class and stores one or more elements of a XML document. The object class defines, for example, the structure corresponding to an element, and includes references or pointers to objects representing the immediate descendants of the element.

Representing Collections with Varrays

XML schemas often define a collection of elements ("collection element") by specifying within a XML schema declaration of an element a maxOccurs attribute with a value >1. Such a collection of elements is represented within a database using a VARRAY column in a table. Each array element in a VARRAY represents a member element in a collection of elements.

An object-relational database system stores a VARRAY column in several ways, referred to herein as forms of VARRAY storage. In one form of VARRAY storage, the inline form, the array elements of a VARRAY column of a table are stored inline within the table. In another form of VARRAY storage, the array elements of a VARRAY column of a table are stored out-of-line in another table ("out-of-line table"). Further details about VARRAYS and forms of VARRAY storage are described in Database Object Collections.

The decision about how to store VARRAYs may be based on various factors. Storing a VARRAY column out-of-line requires more space. However, the out-of-line table may be queried independently and may be indexed, allowing more efficient querying of VARRAYs. Furthermore, a database limitation (such as that for a VARRAY containing a CLOB) may require that a VARRAY column be stored out-of-line rather than inline. Indexing a VARRAY column may also require out-of-line storage.

Schema-level Determination of how to Store Varrays

In an approach for controlling how to store VARRAYs, the form of VARRAY storage is controlled at the XML schema level. All VARRAY column representations for a XML schema are either stored inline or out-of-line. Thus, if a database limitation requires out-of-line storage, or if it is desired to take advantage of some of the features of out-of-line storage, all the collection elements defined by a XML schema have to be stored out-of-line in a VARRAY column even though out-of-line storage is desired or required for only a subset of the collection elements defined by the XML schema. This limitation inflates the storage cost of handling collection elements and proliferates the number of tables needed by a database system to support collection elements.

Based on the foregoing, an improved way of determining how store VARRAYs for collection elements is desired.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for what form of VARRAY storage to use to represent a collection element is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described herein for flexibly determining a form of VARRAY storage for XML collections of elements defined by an XML schema. The determination is made by a mechanism that registers XML schemas with the database system. During the registration of a given XML schema, a database server determines a database representation for the XML schema and generates mapping information. The database representation determination is a determination about what database types should be used to represent a XML schema and/or how instances of the XML schema are stored by a database system. Determining the appropriate database representation for a given XML schema may involve, for example, determining the database types, database objects, collection types, constraints, and even the indexes that are to be used by a database system to store data for XML documents that conform to the given XML schema. The mapping information indicates the mapping between the constructs declared in the XML schema and the constructs included in the appropriate database representation.

According to an embodiment of the present invention, a database server determines, on element-by-element level of granularity, what form of VARRAY storage to map to collections of elements defined by a XML schema. A collection element may be mapped to an in-line VARRAY or an out-of-line VARRAY. An in-line VARRAY is a VARRAY column that is stored in-line. An out-of-line VARRAY is a VARRAY column that is stored out-of-line. The determination may based on a variety of factors, including the database type mapped to the collection element, database limitations that limit the form of VARRAY storage for certain database types, and annotations ("mapping annotations") embedded within a XML schema that specify a database type for a database representation of a collection element or a form of VARRAY storage. Based on these factors, the database determines an appropriate VARRAY representation, including a database type and form of VARRAY storage, and generates mapping information mapping a collection element to a VARRAY representation. The techniques provide greater flexibility for mapping VARRAYs to XML collection elements.

System Overview

Figure 1:
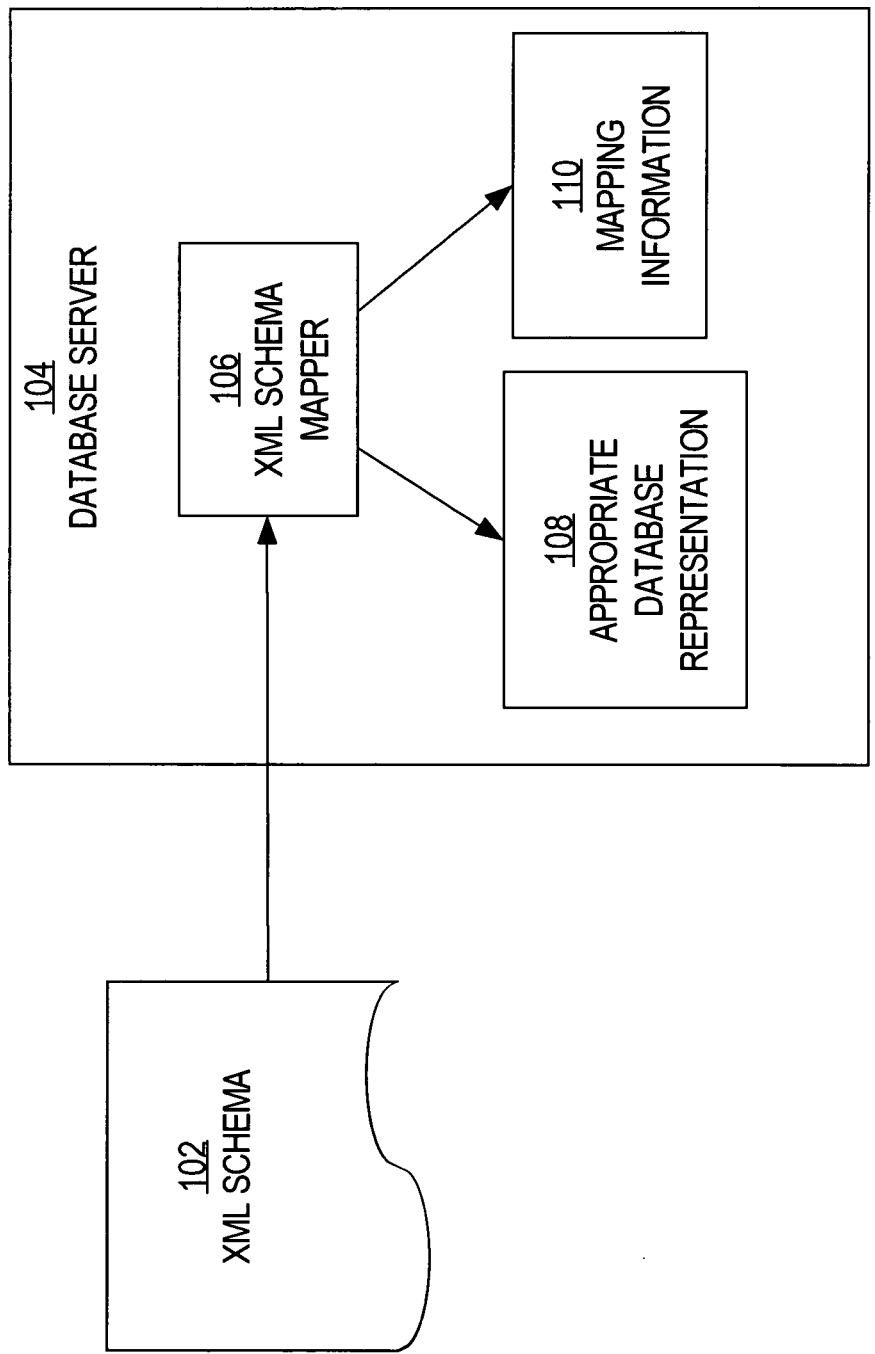
FIG. 1 is a block diagram of a mechanism for determining how to store XML data within an object-relational database system according to an embodiment of the present invention.

FIG. 1 is a block diagram of a system that includes a mechanism for mapping XML schemas to database representations within an object-relational database systems. The system includes a database server 104. A server, such as database server 104, is a combination of integrated software components and an allocation of computational resources, such as memory, one or more computers, and processes on the one or more computers that execute the integrated software components on a processor, the combination of the software and computational resources being dedicated to performing a particular function on behalf of one or more clients. A database server governs and facilitates access to a particular database, processing requests by clients to access the database.

Database server 104 includes a XML schema mapper 106. When a XML schema 102 is registered with database server 104, XML schema mapper 106 determines the appropriate database representation 108 for documents that conform to XML schema 102, and generates mapping information 110 that indicates the correlation between the constructs declared by the XML schema and the elements of the database representation 108.

According to an embodiment, a XML schema has to be first registered with database server 104 before it can be used or referenced within database server 104. After the registration process is completed, XML documents conforming to this schema (and referencing it via the schema URL within the document) can be stored and treated by database server 104 as instances of the XML schema.

Generation Of Mapping Information

Once the appropriate database representation has been determined during registration of a particular XML schema, mapping information is generated to indicate the correlation between the parts of the database representation and the elements identified in the particular XML schema. The mapping information may indicate, for example, that data associated with a specific element of the XML schema should be stored in a particular column of a table that is generated as part of the appropriate database representation. The mapping information enables performance benefits. For example, query performance may be improved by rewriting XPath queries to directly access the underlying columns. In addition, update performance may be improved by rewriting updates to directly update the underlying columns. Consequently, updating a portion of the XML data from a stored document would not always require rewriting the entire XML data for the stored document.

Procedure for Choosing VARRAY Representation

Figure 2:
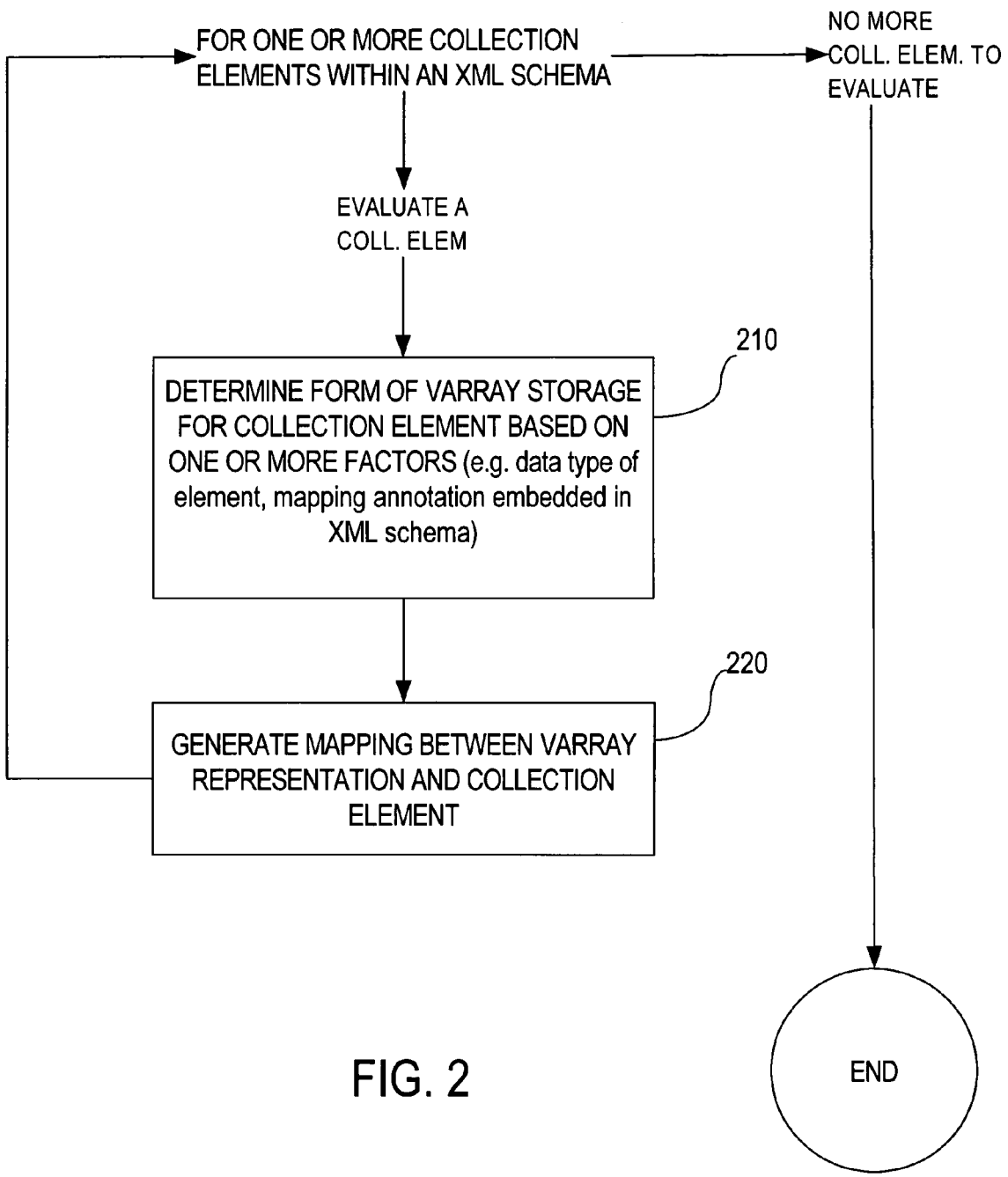
FIG. 2 is a flow chart depicting a process for determining how to represent collections of elements declared by a XML schema using VARRAYs according to an embodiment of the present invention.

FIG. 2 is a flowchart representing a procedure for choosing, within an XML schema on an element-by-element basis, a form of VARRAY storage for a collection element. The procedure may be performed, for example, by a database server when registering a XML schema that declares one or more collection elements.

Referring to FIG. 2, each collection element declaration of one or more collection element declaration is evaluated by the database server. The evaluation includes step 210. At step 210, the database server determines what form of VARRAY storage to use to represent the collection element. The determination is based on one or more factors, examples which are later described.

At step 220, the database server generates a mapping between the collection element declared and a VARRAY column representation, including the form storage determined at step 210. For example, the collection element can be mapped to in-line VARRAY of integers or to a VARRAY of CLOBs holding text or even a XML subtree.

Database Type as Factor

A factor for determining a form of VARRAY storage may be based, at least in part, on a database type that represents a collection element. The following portion of a XML schema S-1 is provided below to illustrate this kind of factor.

```
<element name="Tokens">
    <complexType>
        <sequence>
            <element name="Token" type="TokenType"
            maxOccurs="unbounded"/>
        </sequence>
    </complexType>
</element>
<complexType name="TokenType">
    <sequence>
        <element name="TokenID" type="string"/>
        <element name="TokenText" xdb:SQLType="CLOB">
            <complexType>
                <sequence>
                    <element name="TextHeading" type="string"/>
                    <element name="TextBody" type="string"/>
                </sequence>
            </complexType>
        </element>
    </sequence>
</complexType>
```

XML schema S-1 includes a declaration of the complex type TokenType. The declaration of TokenType includes the mapping annotation xdb: SQLType="CLOB". The mapping annotation specifies to the database server that the database representation for an element of this type should be a CLOB.

Schema S-1 also declares an element with the name Tokens and a maxOccurs attribute of "unbounded". Thus, Tokens is a collection element.

At step 210, the database server determines that the form of VARRAY storage to use for Tokens is out-of-line. The determination is based on the following factors. The mapping annotation specifies that the database type for Tokens is CLOB. Furthermore, the database server does not support inline VARRAYs having database type CLOB but does support out-of-line VARRAYs of this database type.

At step 220, the database server generates a mapping that maps an out-of-line CLOB VARRAY column of a table to element Tokens of XML schema S-1.

The factors described in the above example are illustrative but not limiting. For example, the element declaration for a XML complex type may omit a mapping annotation that maps the complex type to a database type. In this case, the database server independently determines the database type based on XML data type the XML schema declares for the element. In addition, for a database type used to represent a collection element, there may be no database limitation that limits the use of either an in-line or out-of-line VARRAY. In this case, selection between the forms of VARRAY storage can be based on, for example, efficiency factors particular to database types.

Mapping Annotations by Element

The declaration for a collection element may include a mapping annotation that maps a collection element to a form of VARRAY storage. The following portion of a XML schema S-2 is provided as an illustration.

```
<element name="Tokens">
    <complexType>
        <sequence>
            <element name="Token" type="TokenTypeB"
            maxOccurs="unbounded" xdb:storeVarrayAsTable="true"/>
        </sequence>
    </complexType>
</element>
```

Schema S-2 declares an element Tokens of the complex-Type TokenTypeB. The declaration of Tokens includes the mapping annotation xdb:storeVarrayAsTable="true", specifying that the form of VARRAY storage for Tokens should be an out-of-line VARRAY.

Schema S-2 may include declarations of other collection elements that omit mapping annotations that identify a form of VARRAY storage. In this case, the particular form of VARRAY storage to use may be decided by a database server and may be based on other factors, such as efficiency factors or database limitations. Thus, the user has the ability to allow the database server to select a form of VARRAY storage and ability to override the selection when desired.

Alternatively, XML schema S-2 may contain an annotation that specifies a default form of VARRAY storage, such as shown below.

```
<schema xdb:storeVarrayAsTable="false">
.....
......
    <element.... xdb:storeVarrayAsTable="true"/>
.....
```

For a particular declaration of a collection element, the default may be overridden by including a mapping annotation as shown for Token in XML schema S-2.

An embodiment of the present invention as been illustrated using several form VARRAY storage. However, the present invention is not so limited.

Hardware Overview

Figure 3:
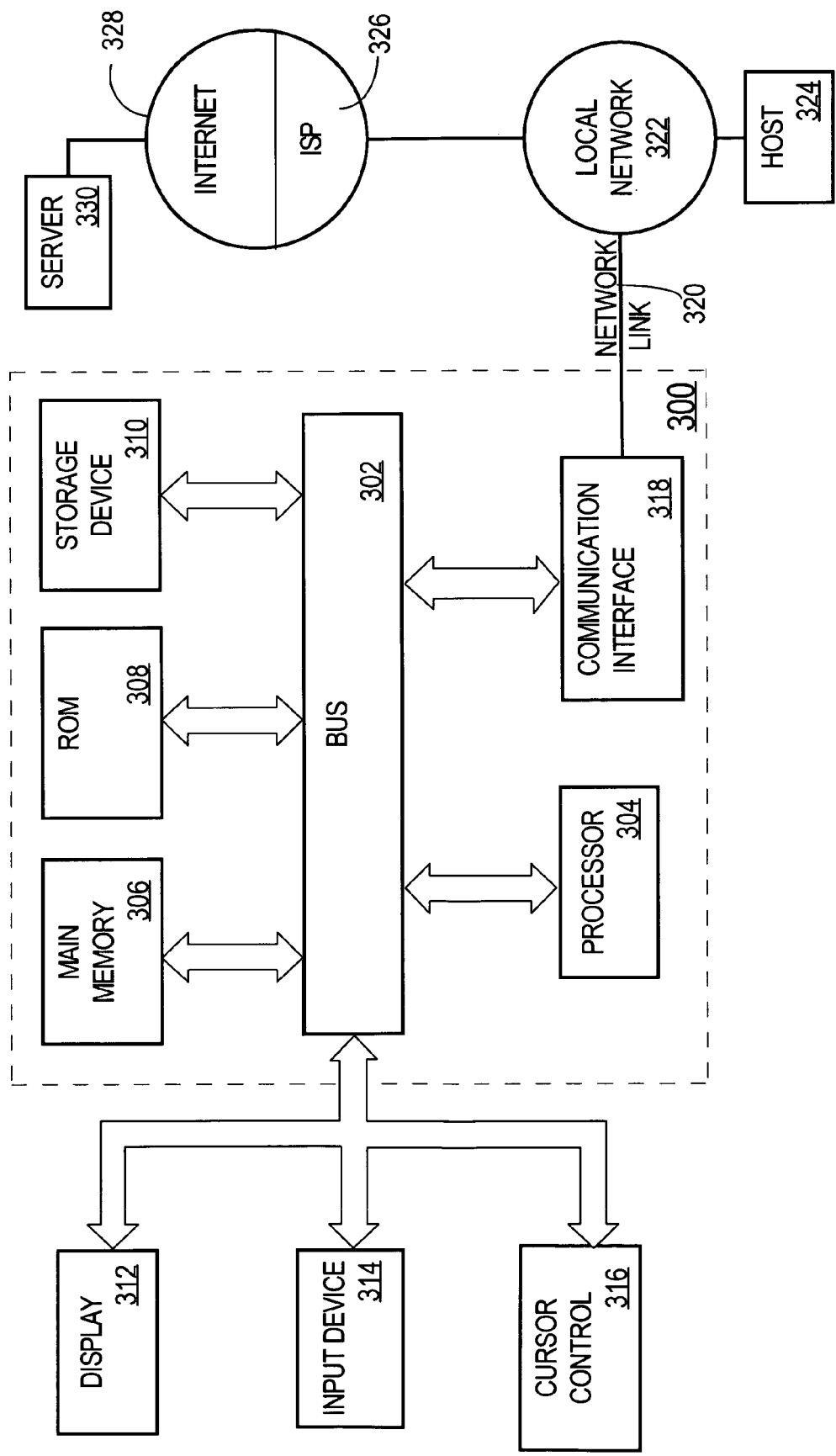
FIG. 3 is a flow chart depicting a computer system which may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method used for managing XML data in a database system, comprising the steps of:
   a database server receiving a XML schema;
   wherein said XML schema includes a plurality of XML schema declarations, wherein a particular declaration of said plurality of XML schema declarations defines a particular collection element;
   based on said particular declaration of said plurality of XML schema declarations that defines said particular collection element, determining a database representation for storing said particular collection element in a database of the database server;

said database server making a certain determination of whether to store the particular collection element as an in-line VARRAY column or an out-of-line VARRAY column based on one or more factors, wherein said one or more factors includes a database type of the database representation determined for storing the particular collection element;

wherein the one or more factors are based on forms of VARRAY storage supported by said database server for the database type; and said database server generating mapping data that maps said particular collection element to a form of VARRAY storage determined by said certain determination.

2. The method of claim 1, wherein one of said forms of VARRAY storage is in-line storage.

3. The method of claim 1, wherein one of said forms of VARRAY storage is out-of-line storage.

4. The method of claim 1, wherein:
said particular declaration of said plurality of XML schema declarations includes a mapping annotation mapping said particular collection element to a form of VARRAY storage; and
the one or more factors are based on said mapping annotation.

5. The method of claim 4, wherein:
said XML schema specifies a default form of VARRAY storage; and
said one or more factors are based on said form of VARRAY storage.

6. A computer-implemented method for mapping a database representation in a database to XML elements defined by a XML schema, comprising the steps of:
a database server evaluating said XML schema, wherein said XML schema includes a plurality of XML schema declarations, each declaration of said plurality of XML schema declarations defining a respective collection element; and
wherein said evaluation includes, for said each declaration of said plurality of XML schema declarations:
making a determination specific to said each declaration of whether to store the respective collection element as an in-line VARRAY or an out-of-line VARRAY based on a database type of a database representation of the respective collection element defined by said each declaration, and
said database server generating mapping data that, for each declaration of said plurality of XML schema declarations:
maps the respective collection element defined by said each declaration to a VARRAY column of a table in said database, and
indicates whether the VARRAY column mapped to the respective collection element defined by said each declaration is stored in-line or out-of-line.

7. The method of claim 6, wherein:
a particular declaration of said plurality of XML schema declarations includes a mapping annotation mapping the respective collection element of said particular declaration to a form of VARRAY storage; and
making a determination specific to said particular declaration of whether to use an in-line VARRAY or an out-of-line VARRAY is based on said mapping annotation.

8. One or more non-transitory computer-readable storage media storing sequences of instructions, which when executed by one or more processors, cause:
a database server receiving a XML schema;
wherein said XML schema includes a plurality of XML schema declarations, wherein a particular declaration of said plurality of XML schema declarations defines a particular collection element;
based on said particular declaration of said plurality of XML schema declarations that defines said particular collection element, determining a database representation for storing said particular collection element in a database of the database server;
said database server making a certain determination of whether to store the particular collection element as an in-line VARRAY column or an out-of-line VARRAY column based on one or more factors, wherein said one or more factors includes a database type of the database representation determined for storing the particular collection element;
wherein the one or more factors are based on forms of VARRAY storage supported by said database server for the database type; and
said database server generating mapping data that maps said particular collection element to a form of VARRAY storage determined by said certain determination.

9. The one or more non-transitory computer-readable storage media of claim 8, wherein one of said forms of VARRAY storage is in-line storage.

10. The one or more non-transitory computer-readable storage media of claim 8, wherein one of said forms said form of VARRAY storage is out-of-line storage.

11. The one or more non-transitory computer-readable storage media of claim 8, wherein:
said particular declaration of said plurality of XML schema declarations includes a mapping annotation mapping said respective collection element to a form of VARRAY storage; and
the one or more factors are based on said mapping annotation.

12. The one or more non-transitory computer-readable storage media of claim 11, wherein:
said XML schema specifies a default form of VARRAY storage; and
said one or more factors are based on said form of VARRAY storage.

13. One or more non-transitory computer-readable storage media storing sequences instructions for mapping a database representation in a database to XML elements defined by a XML schema, said sequences of instructions, which when executed by one or more processors, cause:
a database server evaluating said XML schema, wherein said XML schema includes a plurality of XML schema declarations, each declaration of said plurality of XML schema declarations defining a respective collection element; and
wherein said evaluation includes, for said each declaration of said plurality of XML schema declarations:
making a determination specific to said each declaration of whether to store the respective collection element as an in-line VARRAY or an out-of-line VARRAY based on a database type of a database representation of the respective collection element defined by said each declaration, and
said database server generating mapping data that, for each declaration of said plurality of XML schema declarations:

maps the respective collection element defined by said each declaration to a VARRAY column of a table in said database, and indicates whether the VARRAY column mapped to the respective collection element defined by said each declaration is stored in-line or out-of-line.

14. The one or more non-transitory computer-readable storage media of claim 13, wherein:

a particular declaration of said plurality of XML schema declarations includes a mapping annotation mapping the respective collection element of said particular declaration to a form of VARRAY storage; and the sequences of instructions include instructions, that when executed by said one or more processors, cause making a determination specific to said particular declaration of whether to use an in-line VARRAY or an out-of-line VARRAY to be based on said mapping annotation.

* * * * *